K. KURDA.
PROTECTIVE SYSTEM FOR ELECTRICAL CONDUCTORS.
APPLICATION FILED JAN. 14, 1915. RENEWED AUG. 11, 1920.

1,368,811. Patented Feb. 15, 1921.

UNITED STATES PATENT OFFICE.

KARL KURDA, OF NUREMBERG, GERMANY, ASSIGNOR TO SIEMENS-SCHUCKERTWERKE G. M. B. H., OF BERLIN, GERMANY, A CORPORATION OF GERMANY.

PROTECTIVE SYSTEM FOR ELECTRICAL CONDUCTORS.

1,368,811.     Specification of Letters Patent.     Patented Feb. 15, 1921.

Application filed January 14, 1915, Serial No. 2,264. Renewed August 11, 1920. Serial No. 402,859.

*To all whom it may concern:*

Be it known that I, KARL KURDA, a German subject, and resident of Nuremberg, Germany, have invented certain new and useful Improvements in Protective Systems for Electrical Conductors, of which the following is a specification.

The object of the present invention is to equalize the strength of an electric field existing between conductors carrying high potential currents and other conductive elements for instance structural supports or the like, which are for instance connected to ground.

In the accompanying drawings I have illustrated my invention.

In these drawings—

Figure 1:
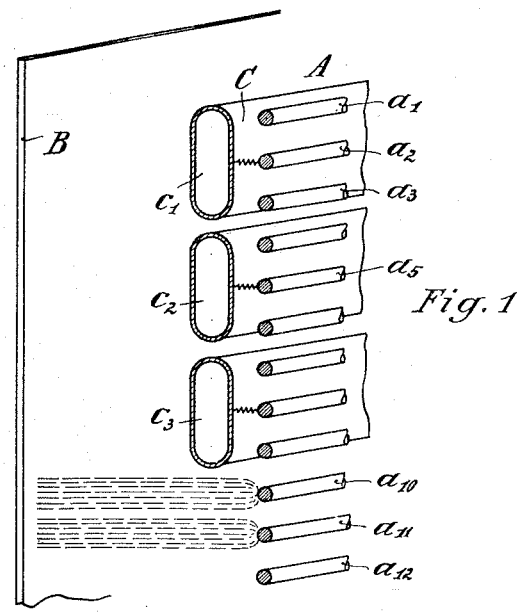
Figure 1 shows in perspective view one of the forms of my invention.

Referring now to Fig. 1, A represents a system of conductors $a_1, a_2 \ldots a_{12}$ running substantially in parallel to each other, and each carrying current of a potential different from that of the adjacent conductor. B represents a conductive surface, for instance the wall of a protective casing, supporting structure or the like, and it may be assumed that this wall is connected to ground. If now for instance the potential of conductor $a_1$ against B amounts to 500 kilovolts and that of conductor $a_{12}$ against B amounts to only 100 kilovolts, the potential between the individual adjacent conductors may vary in equal or unequal amounts. In such an arrangement an electric field is produced between the conductors of system A and the surface B. The lines of force of this field are crowded together on the small surface of the conductors in the manner shown for instance with respect to conductors $a_{10}$ and $a_{11}$. The sharper the curvature of the surface of the conductors, especially the smaller their diameter, the more the lines of force will be crowded, until their density becomes so great that in air brush discharges occur and in oil the quality of the latter is impaired. In either case a flash-over eventually occurs.

In order to overcome this difficulty, I propose according to my invention to interpose a grid system C of conductive elements $c_1, c_2 \ldots$ etc., between the conductor system A and the plate B. The number of elements $c$ is smaller than that of the conductors $a$ and they are less curved than the latter. Also these elements $c$ are connected with some of the conductors $a$, as shown for instance at $c_1$—$a_2$, $c_2$—$a_5$.

By such grid arrangement the system A of conductors is protected, because the electric lines of force do not any more extend from the conductors $a$ to plate B but emanate from the grid elements $c$, which have the potential of some of the conductors $a$, in less crowded condition owing to the larger area of those elements. On the other hand the potential of the elements against the adjacent conductors $a$ is comparatively small, owing to their aforementioned connection with some of the adjacent conductors. This expedient reduces the maximum field strength between the grid C and the plate B to a value far below the flash-over point and renders operation of the apparatus comparatively safe from insulation break downs.

Figure 2:
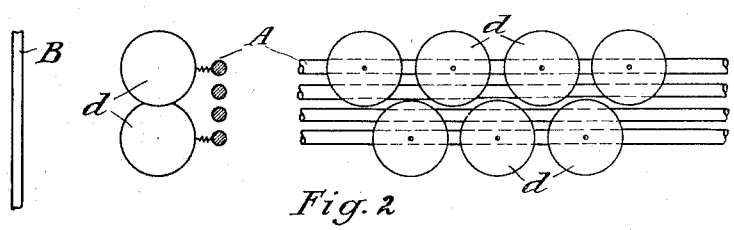
Fig. 2 shows a modification in substantially diagrammatic form in end and side elevation.

In the arrangement described laminated grid elements $c$ are used in the shape of thin-walled metal tubes as shown and each section $c$ is comparatively short in the direction in which the conductors $a$ extend. In Fig. 2 the grid is constructed in another way. Instead of using tubes $c$ connected at intervals with conductors $a$, a series of conductive balls $d$ is interposed between the conductors and the plate B, and arranged as shown (support not shown).

Figure 3:
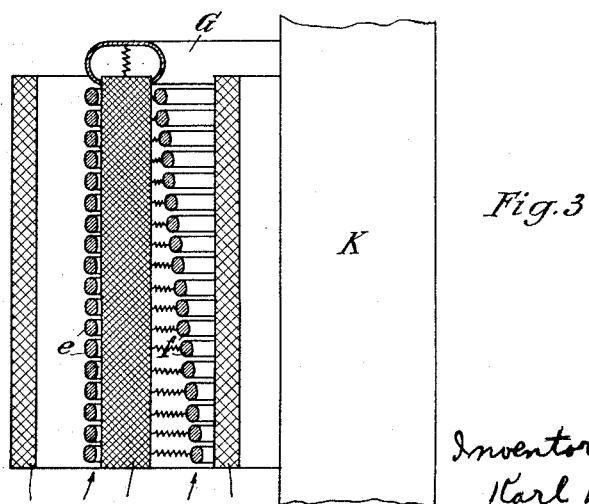
Fig. 3 shows another modification in vertical section applied to the windings of a transformer.

Fig. 3 shows my invention applied to a high potential transformer. K represents the iron core of the transformer of which only the windings on the left hand side of the center line of the core are shown. H is the high voltage winding, $M_1$ $M_2$ form together the low voltage winding.

According to my invention I provide two cages E and F formed of conductive elements $e$ and $f$ respectively and arranged so that they screen the cylindrical body of high tension winding H outside and inside. The cage elements $e$ and $f$ follow substantially the contour of the winding surface. They do not form however individual closed rings but are cut into a suitable number of sections to avoid their forming each a short circuit winding for the transformer. Each element $e$ and $f$ is connected to a portion of the high tension winding, so that consecutive elements $e$ and $f$ are connected at consecutive substantially uniform intervals to this winding. Cage E is shown cylindrically shaped whereas cage F has the form of the frustum of a cone. If desired also cage E may have this form. In employing a cage form as shown at F an approximately uniform electric field is created between the cage and the portion of the transformer from which the high tension winding is to be screened, (in this case $M_2$), provided the upper end of the high tension winding, as is usually the case, bears the high tension terminals, so that its lower portion has a smaller potential against ground than the upper.

To complete the protection of the transformer the upper end of the high voltage winding is covered with an annular conductive cap G which is connected with one of the last turns of that winding but which, like elements $e$ and $f$, should be interrupted at one or several places to prevent the occurrence of short circuit currents.

Of course it will be noted that in all forms shown, new electric fields are produced between the individual adjacent grid elements. However such fields are due only to comparatively small potentials which are determined by the size of steps at which the grid elements are connected to the winding, and the value of which therefore can be easily controlled within certain limits. Besides the surfaces of the grid elements facing each other may be given a sufficiently great radius of curvature, to prevent dangerous crowding of the electric lines of force.

I claim:

1. Means for screening a plurality of electrical conductors carrying high potential currents from surrounding conducting bodies comprising a grid system having a plurality of adjacent conducting elements extending over the area covered by said conductors and located between the said conductors and said conducting bodies, said elements having a curved surface of a radius larger than that of said conductors and being connected to some of said conductors at suitable intervals.

2. Means for screening in a transformer the high potential winding from the low potential winding, comprising a cage disposed on either side of said high potential winding, each cage consisting of adjacent individual conducting elements spaced apart, said elements having a curved surface of radius larger than that of the conductors of which said winding is composed, each element being connected to one of the turns of said winding immediately opposite to it.

3. Means for screening in a transformer the high potential winding from the low potential winding, comprising a cage disposed on either side of said high potential winding, each cage consisting of adjacent individual conducting elements spaced apart, said elements having a curved surface of radius larger than that of the conductors of which said winding is composed, each element being connected to one of the turns of said winding immediately opposite to it, said high potential winding having its terminals at one of its ends, the distance of the elements of at least one cage from said high potential winding gradually increasing from the end where the high potential terminals are located toward the opposite end of the winding.

In testimony whereof I have hereunto set my signature in the presence of two subscribing witnesses.

KARL KURDA.

Witnesses:
OSCAR BOCK,
CHRISTIAN BACUNDER.